United States Patent [19]

Ravel et al.

[11] Patent Number: 4,896,502

[45] Date of Patent: Jan. 30, 1990

[54] RAMJET ENGINE EQUIPPED WITH A PLURALITY OF CARBURATED AIR SUPPLY NOZZLES AND A MISSILE EQUIPPED WITH SUCH A RAMJET ENGINE

[75] Inventors: Maurice Ravel, Jouy-en-Josas; Jean Viala, Charenton-le-Pont, both of France

[73] Assignee: Aerospatiale Societe Nationale Industrielle, Paris, France

[21] Appl. No.: 911,016

[22] Filed: Sep. 17, 1986

[30] Foreign Application Priority Data

Sep. 17, 1985 [FR] France ................................ 85 13736

[51] Int. Cl.$^4$ .............................................. F02K 7/10
[52] U.S. Cl. .................................................. 60/270.1
[58] Field of Search .......................................... 60/270.1

[56] References Cited

U.S. PATENT DOCUMENTS

| | | | |
|---|---|---|---|
| 4,110,977 | 9/1978 | Jandl | 60/270.1 |
| 4,194,519 | 3/1980 | Baker | 60/270.1 |
| 4,539,811 | 9/1985 | Dale | 60/270.1 |
| 4,562,699 | 1/1986 | Rowe | 60/270.1 |

*Primary Examiner*—Donald P. Walsh
*Attorney, Agent, or Firm*—Antonelli, Terry & Wands

[57] ABSTRACT

A ramjet engine of the type including a combustion chamber into which n air ducts open, each air duct being equipped with a fuel injector device. A total fuel flow quantity D is introduced into the combustion chamber so that a relationship D/n would generally be provided for individual fuel flow by a respective injector device. A distributor is provided which regulates the individual fuel flow of at least one of the injector devices to be at a value different from the D/n relationship.

10 Claims, 2 Drawing Sheets

RAMJET ENGINE EQUIPPED WITH A PLURALITY OF CARBURATED AIR SUPPLY NOZZLES AND A MISSILE EQUIPPED WITH SUCH A RAMJET ENGINE

This invention concerns the type of ramjet engine containing a combustion chamber into which n air nozzles (n>1) open, for example two to two symmetrical in relation to the axis of the combustion chamber, and each one equipped with a fuel injector device. It also concerns an aerial moving body, such as a missile or something similar, propelled by such a ramjet engine.

In this type of ramjet engine, the total flow D of fuel introduced in the combustion chamber results in the amount of individual flows di of fuel respectively introduced by the injector devices in the air nozzles, each individual flow di being equal to the relationship of D/n.

It is known that such ramjet engines when in operation often produce inside their combustion chamber, high intensity internal pressure vibrations which deteriorate, on the one hand, the insulating internal thermic protection of the combustion chamber and, on the other hand, the equipment attached to the structure of the moving body.

To attempt to remedy the effects of these derivative vibrations, which correspond in general to tangential acoustic modes, certain measures have already been proposed, such as modification of the distribution of injector devices in the air nozzles or acoustic absorption using longitudinal rods placed on the internal wall of shields. However, these measures have proved to be insufficient.

The object of this invention is to remedy the above-mentioned disadvantages and in particular to eliminate or reduce the field and amplitude of high frequency instabilities generated by the combustion inside the chamber. The invention can be put into use either individually or in combination with other measures aimed at the same objects.

To this end, according to the invention, the type of ramjet engine containing a combustion chamber into which n air nozzles open, each one equipped with a fuel injector device, with the total flow of D fuel introduced into the combustion chamber resulting in the amount of individual fuel flows respectively introduced by the injector devices in said air nozzles, is remarkable in that it includes means to regulate, at least temporarily, the individual fuel flow of at least some of the injector devices at a different value from the D/n relationship.

In fact, the inventors have found that, by making the distribution of fuel dissymetrical in relation to the axis of the combustion chamber, it was possible to eliminate, or at least to heavily reduce the parasite vibrations.

This dissymmetrization takes into account the fact that the total flow must at all times take a determined value to ensure a required thrust.

Thus, if at the time of flight of the aerial moving body, this thrust requires a total flow D, this flow will be equal to $$D = \sum_1^n d_i = \sum_1^n a_i D,$$

by calling for:
$d_i$ the individual flows of n injector devices
$a_i$ the fractions of the total flow D, such as $d_i = a_i D$
i being a whole number varying from 1 to n.

Consequently, the first, second, ... th, ... th air nozzles respectively provide to the fuel chamber individual flows equal to $$a_1 D, a_2 D, \ldots a_i D, \ldots a_n D, \text{ with } \sum_1^n a_i = 1.$$

Of course, the different coefficients $a_i$ can be variable according to time or parameters such as:
pressure and temperature of the air supply,
relation of the $$\frac{\text{fuel flow}}{\text{air flow}}$$

required by the thrust demand,
flight conditions of the moving body propelled by the ramjet engine: altitude, Mach number, incidence, etc.

To its advantage, the ramjet engine is provided with an ability to operate according to a first mode in which the individual flows are equal and at least a second mode in which the individual flows are unequal and it includes at least a measurement path to allow a continuous elaboration of the parameters required for the control of the regulation methods.

The measurement paths include for example at least a supply pressure and/or temperature pick-up placed inside the air nozzles.

Preferably, the regulation methods are capable of making the ramjet engine operate according to at least two second modes and they include a computer capable, at all times, together with the measurement path, to apply to the ramjet engine that of the first and second modes of fuel supply which is optimum.

In a first production mode, the regulation methods include an electromagnetic valve for regulation by an air nozzle, these electromagnetic valves being linked together to a fuel tank and operated in parallel.

According to a production variant, the regulation methods include an electromagnetic valve shared by all air nozzles, linked to a flow distributor.

The FIGURES of the attached diagram show how the invention can be produced. On these FIGURES, identical references indicate similar elements.

Figure 1:
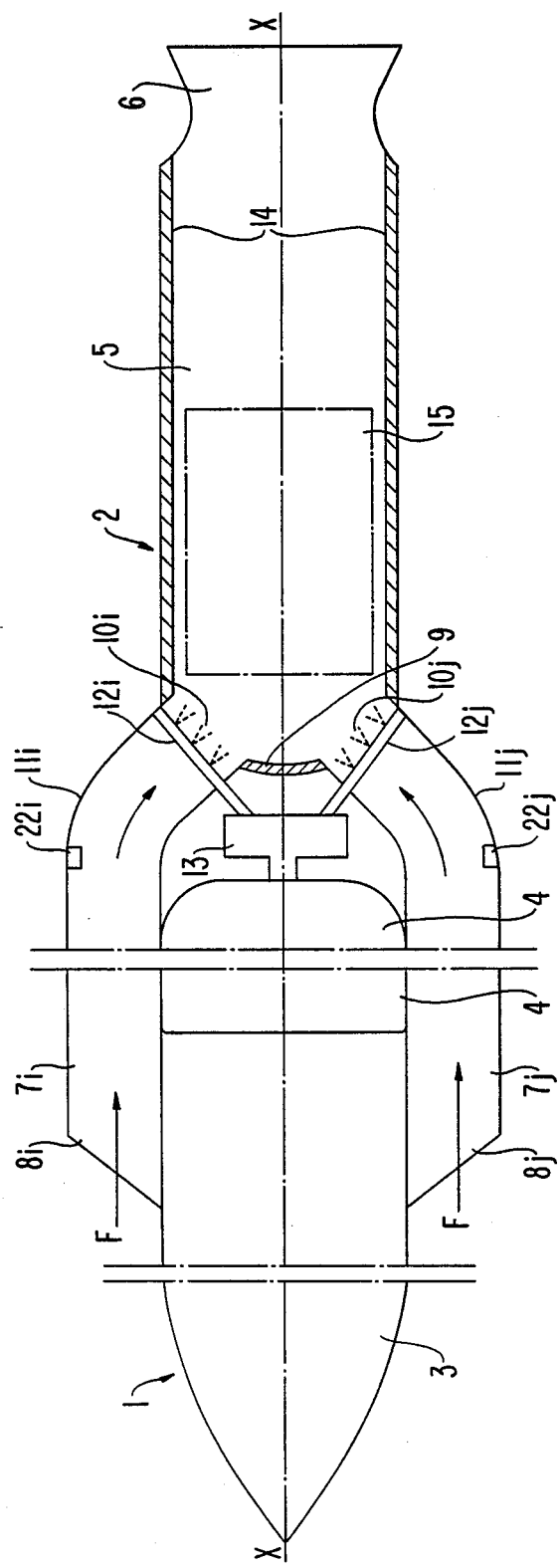
FIG. 1 shows schematically, in a longitudinal cut, a missile equipped with the type of ramjet engine to which the invention applies.

In FIG. 1, a missile 1 is shown propelled by the type of ramjet engine 2 concerned in this invention.

Missile 1 is made up of a body 3 containing, among others, the equipment and usual loads (which are not shown since they are not involved in the invention), a fuel tank 4, to supply ramjet engine 2, attached to the rear section of the said body 3.

The ramjet engine 2 is made up of a combustion chamber 5, ending in the rear by an exhaust nozzle 6 and linked, towards the front, to a plurality of n air nozzles $7_1, 7_2, \ldots, 7_i, 7_j \ldots 7_n$. In FIG. 1, only air nozzles $7_i$ and $7_j$ are visible.

The $7_i$ air nozzles (with $1 \leq i \leq n$) are laid out at the periphery of body 3 and they are integral with it. Each of them, towards the front, includes a corresponding air inlet $8_i$ and, towards the rear, opens into the front part 9 of the combustion chamber 5 through a corresponding opening $10_i$.

Preferably, the front part 9 of the combustion chamber 5 is at least perceptibly spherical.

It is also advantageous if the diameter of the combustion chamber 5, which is aligned with body 3, adjoins the body. In these conditions, an elbow $11_i$ is provided in each air nozzle $7_i$ to connect the part of the latter attached to the exterior wall of body 3 at the corresponding opening $10_i$ of combustion chamber 5.

In each air nozzle $7_i$ a fuel injection device $12_i$ is provided, preferably in the proximity of the corresponding $10_i$ opening. The devices $12_i$ are controlled by a fuel supply and regulation device 13 carried by body 3 and connected to tank 4.

Preferably, a thermic protection covering 14 is provided on the interior walls of combustion chamber 5.

Operation of missle 1 can be the following.

Initialy, the ramjet engine 2 not being in service, the missile 1 is propelled by a consumable propulsion system 15 (for example a powder charge set inside combustion chamber 5).

When propulsion system 15 is in operation:
the air nozzles are obturated (by the obturators not shown) at the entrance of the combustion chamber 5;
an accelerator nozzle (not shown) of a smaller dimension than that of the ramjet engine is in place at the exit of combustion chamber 5.

When propulsion system 15 ends operation, the accelerator nozzle and the obturators are ejected and air penetrates (arrow F) into the air nozzles $7_i$ through openings 8, and is led into combustion chamber 5.

At the end of operation of the consumable propulsion system 15, the device 13 supplies the injector devices $12_i$ with fuel and the latter is ignited. The ramjet engine then begins operation and takes over from propulsion system 15 (which has disappeared) to propel missile 1.

As indicated above, the n air nozzles $7_i$ are for example two to two symmetrical in relation to the longitudinal axis X—X of missile 1 and the combustion chamber 5 and, as is usual, the total flow D of the fuel introduced into the latter is obtained by the amount of n individual flows $d_i = D/n$ provided by the injector devices $12_i$. In certain flying conditions, it has been noted that the combustion chamber 5 undergoes strong vibrations, capable of destroying the thermic protection 14 and even missile 1.

The inventors have noted that these disadvantages can be avoided by conveying to at least some of these n individual flows $d_i$ of fuel injector devices $12_i$ of values $a_i D$ different from $D/n$.

Figure 2:
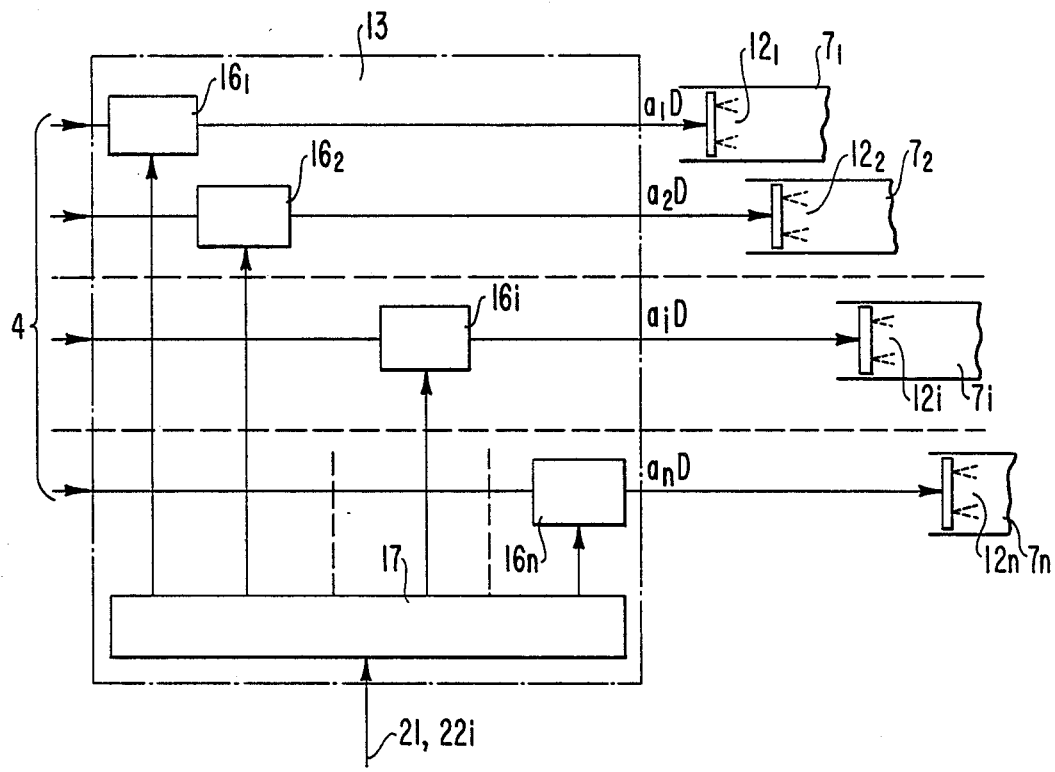
FIG. 2 is a schematic view of an operational mode of the invention.

In the production mode of the invention illustrated in FIG. 2, the control device 13 is made up of a plurality of electromagnetic valves $16_i$, each one linked to an injector device $12_i$ and together supplied with fuel from tank 4. The electromagnetic valves $16_i$ each provide, to the corresponding air nozzle $7_i$, a fuel flow equal to $a_i D$, with $0 \leq a_i \leq 1$ and $$\sum_{1}^{n} a_i = 1.$$

For this, they are controlled by a computer 17. For some flight phases of missile 1, each $a_i$ can be equal to $1/n$. However, for other flight phases, at least some $a_i$ can take values different from $1/n$, with the condition $$\sum_{1}^{n} a_i = 1 \text{ being maintained.}$$

Figure 3:
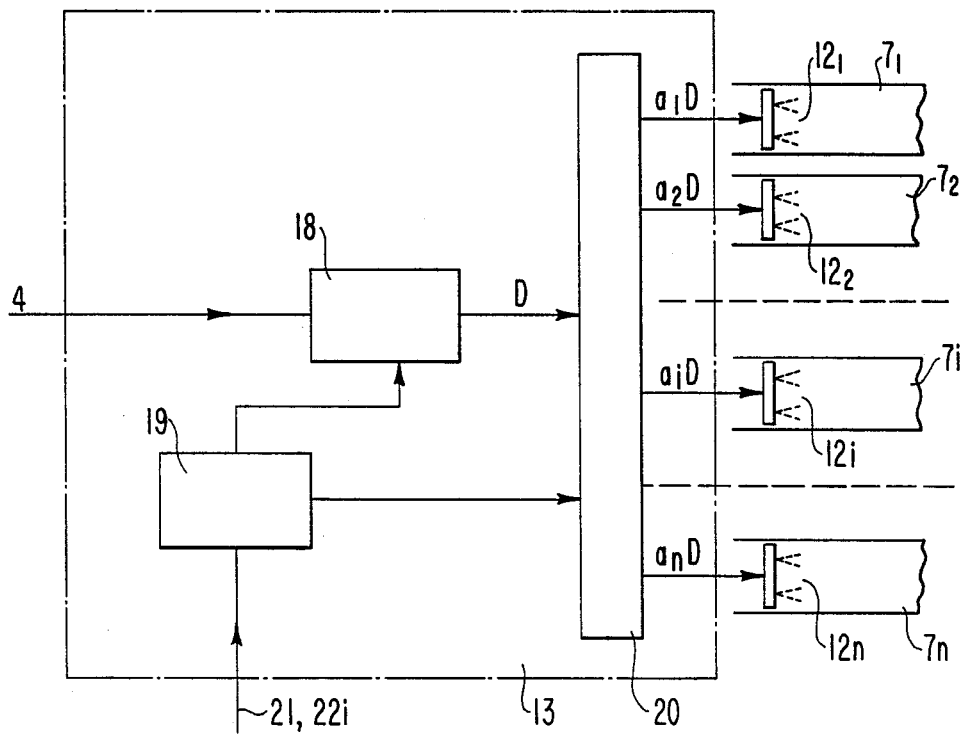
FIG. 3 illustrates schematically a production variant of this invention.

In the production variant of FIG. 3, the control device 13 contains a single electromagnetic valves 18 controlled by computer 19 to provide the flow D. A flow distributor 20 controlled by the computer 19 receives this flow D and provides distribution between the different injection devices $12_i$ to direct to the latter the different individual flows $a_i D$, as mentioned above.

Computers 17 and 19 are capable of varying the different values $a_i$ to reduce to a maximum the combustion vibrations in the combustion chamber 5.

For example, in a military missile 1 with two air nozzles $7_i$ for which, in the whole field of flight, the air pressure p inside the said nozzles is between 0.6 bar and 10 bars. If an operation without vibrations is desired, it has been established that the following is necessary:

When $p < 2$ bars and $p > 4$ bars, the individual fuel flows in the two air nozzles be equal, that is that $a_1 = a_2 = 0.5$.

When $2 \text{ bars} < p < 4 \text{ bars}$, one of the individual flows be equal to 0.7D, the other therefore being equal to 0.3D.

According to another variant, a safety (or emergency) device containing at least one vibration detector made up of at least one pressure pick-up $22_i$ linked to a computer 17 and 19 is capable of delivering a signal as soon as the level of vibrations surpasses certain thresholds. In the case where the fuel inside the combustion chamber of the ramjet engine still presents vibrations with the variables $a_i$ defined above, a second series of replacement variables $b_i$ can be used. The change in these variables is then ordered by a signal provided by the vibration detector as soon as the effective pressure level in certain frequency bands surpasses a given value.

Therefore, if at a given instant in the operation of ramjet engine 2, a distribution of individual flows $a_i D$ generates harmful vibrations, computers 17 and 19 control the electromagnetic valves $16_i$ or distributor 20 to apply to ramjet engine 2 another distribution of individual flows, preferably optimized.

We claim:
1. A ramjet engine comprising:
a combustion chamber having a longitudinal axis;
a plurality n of air ducts communicating with one end of the combustion chamber and being distributed about the longitudinal axis of the combustion chamber, n being an integer greater than one;
a plurality n of injector devices, one of the plurality of injector devices being located in a respective one of the plurality of air ducts;
a fuel tank;
means for supplying the plurality of injector devices with fuel from the fuel tank so as to provide a total fuel flow of quantity D to the plurality of injector devices; and
means for distributing the total fuel flow D among the plurality n of injector devices so that at least one of the plurality of injector devices is provided with an individual fuel flow different from $D/n$ for enabling reduction in vibration.

2. A ramjet engine according to claim 1, wherein the distributing means includes computing means responsive to data indicative of at least one of air pressure and vibration in each of the plurality of air ducts and for calculating an individual fuel flow different from D/n in accordance therewith, and control means responsive to the computing means for controlling the individual fuel flow to respective ones of the plurality of injector devices.

3. A ramjet engine according to claim 2, wherein the distributing means also enables an individual fuel flow of D/n to each of the plurality of injector devices.

4. A ramjet engine according to claim 3, wherein the distributing means distributes the total fuel flow D amoung the plurality n of injector devices so that more than one of the plurality of injector devices is provided with an individual fuel flow different from D/n.

5. A ramjet engine according to any one of claims 1–3 wherein the distributing means include electromagnetic valve means associated with the plurality of injector devices for controlling fuel flow thereto.

6. A ramjet engine according to claim 5, wherein the electromagnetic valve means includes a plurality n of electromagnetic valves, one of the plurality of electromagnetic valves being associated with a respective one of the plurality of injector devices.

7. A ramjet engine according to claim 5, wherein the electromagnetic valve means includes a single electromagnetic valve and a flow distributor, the flow distributor controlling the individual fuel flow in respective ones of the plurality of injector devices.

8. A ramjet engine according to claim 2, further comprising at least one pressure pick-up device disposed in at least one air duct for providing date indicative of air pressure, the computing means being responsive thereto.

9. A ramjet engine according to claim 2, further comprising at least one vibration detector for detecting vibration in at least one air duct and providing data indicative thereof, the computing means being responsive thereto.

10. A ramjet engine according to claim 1 or 2, wherein the ramjet engine forms a propulsion system of a missile.

* * * * *